United States Patent
Polese (10) Patent No.: US 9,136,708 B2
(45) Date of Patent: Sep. 15, 2015

(54) SIMULTANEOUS DISTRIBUTION OF AC AND DC POWER

(75) Inventor: Luigi Gentile Polese, Thornton, CO (US)

(73) Assignee: Alliance For Sustainable Energy, LLC, Golden, CO (US)

( * ) Notice: Subject to any disclaimer, the term of this patent is extended or adjusted under 35 U.S.C. 154(b) by 805 days.

(21) Appl. No.: 13/354,228

(22) Filed: Jan. 19, 2012

(65) Prior Publication Data

US 2012/0181853 A1    Jul. 19, 2012

Related U.S. Application Data

(60) Provisional application No. 61/434,233, filed on Jan. 19, 2011.

(51) Int. Cl.
*H02J 3/02* (2006.01)

(52) U.S. Cl.
CPC ........................ *H02J 3/02* (2013.01)

(58) Field of Classification Search
CPC ........... H02J 3/02; H02J 3/36; H02J 14/0221; H04L 12/10; G05B 11/016; H02P 13/06; H04B 3/56; H04B 3/54; H04B 1/1607; H03H 1/02
USPC ............................................ 307/1, 2, DIG. 1
See application file for complete search history.

(56) References Cited

U.S. PATENT DOCUMENTS

| | | | | |
|---|---|---|---|---|
| 3,399,278 A * | 8/1968 | Dahlman | .................... | 370/478 |
| 3,760,109 A * | 9/1973 | Kogo et al. | .................... | 370/479 |
| 4,156,150 A * | 5/1979 | Harrigan et al. | .................. | 307/2 |
| 4,425,564 A * | 1/1984 | Steele | .......................... | 370/298 |
| 4,930,126 A * | 5/1990 | Kazecki et al. | ................. | 370/521 |
| 5,532,655 A * | 7/1996 | Nguyen et al. | ..................... | 333/1 |
| 6,160,728 A | 12/2000 | Peterson et al. | | |
| 6,184,742 B1 | 2/2001 | Mulder et al. | | |
| 6,338,010 B1 * | 1/2002 | Sparks et al. | ..................... | 701/1 |
| 6,861,825 B2 | 3/2005 | Barthold | | |
| 7,050,311 B2 | 5/2006 | Lai et al. | | |
| 7,432,615 B2 | 10/2008 | Hjort | | |
| 2006/0192434 A1 * | 8/2006 | Vrla et al. | ........................ | 307/64 |
| 2010/0080367 A1 | 4/2010 | Miskin | | |
| 2010/0246232 A1 | 9/2010 | Chen et al. | | |

OTHER PUBLICATIONS

Andreotti et al., "Optimal Design of Combined AC-DC Transmission Lines," International Symposium on Power Electronics, Electrical Drives, Automation and Motion, Jun. 11-13, 2008, Isola d'Ischia, Italy, pp. 411-415.

(Continued)

*Primary Examiner* — Thienvu Tran
*Assistant Examiner* — David M Stables
(74) *Attorney, Agent, or Firm* — John C. Stolpa; Michael A. McIntyre (57) ABSTRACT

A system and method for the transport and distribution of both AC (alternating current) power and DC (direct current) power over wiring infrastructure normally used for distributing AC power only, for example, residential and/or commercial buildings' electrical wires is disclosed and taught. The system and method permits the combining of AC and DC power sources and the simultaneous distribution of the resulting power over the same wiring. At the utilization site a complementary device permits the separation of the DC power from the AC power and their reconstruction, for use in conventional AC-only and DC-only devices.

11 Claims, 8 Drawing Sheets

(56) References Cited

OTHER PUBLICATIONS

Basu et al., "Stability Enhancement of Power System by Controlling HVDC Power Flow through the Same AC Transmission Line," 2009 IEEE Symposium on Industrial Electronics and Applications, Oct. 4-6, 2009, Kuala Lumpur, Malaysia, pp. 663-668.

Povh et al., "Integtated AC/DC Transmission Systems—Benefits of Power Electronics for Security and Sustainability of Power Supply," Survey Paper 2-Part 1, 16th Power Systems Computation Conferece, Jul. 14-18, 2008, Glasgow, Scotland, pp. 1-10.

Rahman et al., "Enhanced Power Transfer by Simultaneous Transmission of AC-DC: A New Facts Concept," Conference Paper, Second International Conference on Power, Electronics, Machines, and Drives, vol. 1, Mar. 31-Apr. 2, 2004, Edinburgh, Scotland, pp. 186-191.

Rahman et al., "Power Upgrading of Transmission Line by Combining AC-DC Transmission," IEEE Transactions of Power Systems, vol. 22, No. 1, Feb. 2007, pp. 459-466.

Shu et al., "Reliability Evaluation for Main Electrical Scheme of Simultaneous AC-DC Power Transmission," International Conference on Sustainable Power Generation and Supply, Apr. 6-7, 2009, Nanjing, China, pp. 1-6.

Singh et al., "A New Topology of 3-Phase PWM AC/DC Converter for Telecommunication Supply Systems," 2000 IEEE Industry Applications Conference, vol. 4, Oct. 8-12, 2000, Rome, Italy, pp. 2290-2296.

Singh, et al., "Interleaved 3-Phase PWM AC/DC Converters Based on a 4 Switch Topology," IEEE 31st Annual Power Electronics Specialists Conference vol. 2, Jun. 18-23, 2000, Galway, Ireland, pp. 1005-1011.

Somlal, "Power upgrading of Transmission Line by combining AC-DC Transmission," Latest Trends on Systems, vol. 1, 14th WSEAS Internation Conference on Systems (Part of the 14th WSEAS CSCC Multiconference), Jul. 22-24, 2010, Curfu Island, Greece, pp. 311-318.

Rahman, et al., "Power Upgrading by Simultaneous ac-dc Power Transfer in a Double Circuit ac Line," IEEE 2006 Power India Conference, Apr. 10-12, 2006, New Delhi, India.

http://en.wikipedia.org/wiki/Pulse-width_modulation—Wikipedia Pulse-width modulation accessed Jul. 31, 2014.

Rahman et al., "Stability improvement of power system by simultaneous AC-DC power transmission," Electric Power Research, vol. 78, Issue 4, Apr. 2008, pp. 756-764.

http://www.caseydiers.com/sinewavedimming.htm accessed Aug. 13, 2014.

http://livedesignonline.com/mag/lighting_silence_lamps_new/ accessed Aug. 13, 2014.

http://www.mysite.du.edu/~etuttle/electron/elect5.htm accessed Aug. 13, 2014.

http://www.ni.com/pdf/products/us/4sw486-487_502.pdf accessed Aug. 13, 2014.

http://www.pickeringtest.com/en-us/product/dual-24-channel-mux-2kv-switch-3kv-iso accessed Aug. 13, 2014.

* cited by examiner

SIMULTANEOUS DISTRIBUTION OF AC AND DC POWER

CONTRACTUAL ORIGIN

The United States Government has rights in this invention under Contract No. DE-AC36-08G028308 between the United States Department of Energy and the Alliance for Sustainable Energy, LLC, the Manager and Operator of the National Renewable Energy Laboratory.

TECHNICAL FIELD

The described subject matter relates to simultaneous distribution of alternating current (AC) and direct current (DC) power.

BACKGROUND

With the pervasive adoption of on-site sources of DC (Direct Current) power in new and existing buildings through distributed generation of renewable energy, mainly from Photovoltaic Panels (PV), the prospect of direct use of DC power at all those electrical loads that run natively on DC has become increasingly appealing. Despite AC (Alternating Current) being the standard in power distribution almost everywhere in the world, components of HVAC systems, fluorescent ballasts, and most Miscellaneous Electrical and Electronic Loads (MEELs) almost exclusively use DC as a power source. DC power use in buildings has significant energy savings potential through the elimination of inverters necessary to convert the DC source into AC, as well as the elimination of the countless equipment (often quite energy-inefficient) normally used to re-convert the AC back to DC.

The inefficiencies introduced by existing power distribution systems results in unnecessary double power conversion. That is, inverters and the subsequent AC to DC converters for DC power supply duplicate the components necessary for power distribution. The power distribution system may be simplified and components eliminated through the introduction of an additional dedicated DC-only electrical wiring infrastructure throughout the building. However, this solution adds significant capital costs introduced by the need to basically double the electrical wiring. Moreover, it is only applicable, at least in principle, to the design of new buildings.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements.

Systems and methods described herein provide a new technology and device concept for the transport and distribution of both AC and DC power over the same wiring normally used for distributing AC power only (e.g., residential and/or commercial buildings' electrical wires). In particular, the system and method enables the simultaneous distribution of AC and DC power over the same wiring, and also enables the separation of DC power from the AC at the utilization site for use in conventional AC-only and DC-only devices. The system and methods implements two new devices, referred to herein as a "Power Combiner" and a "Power Separator."

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

Figure 1:
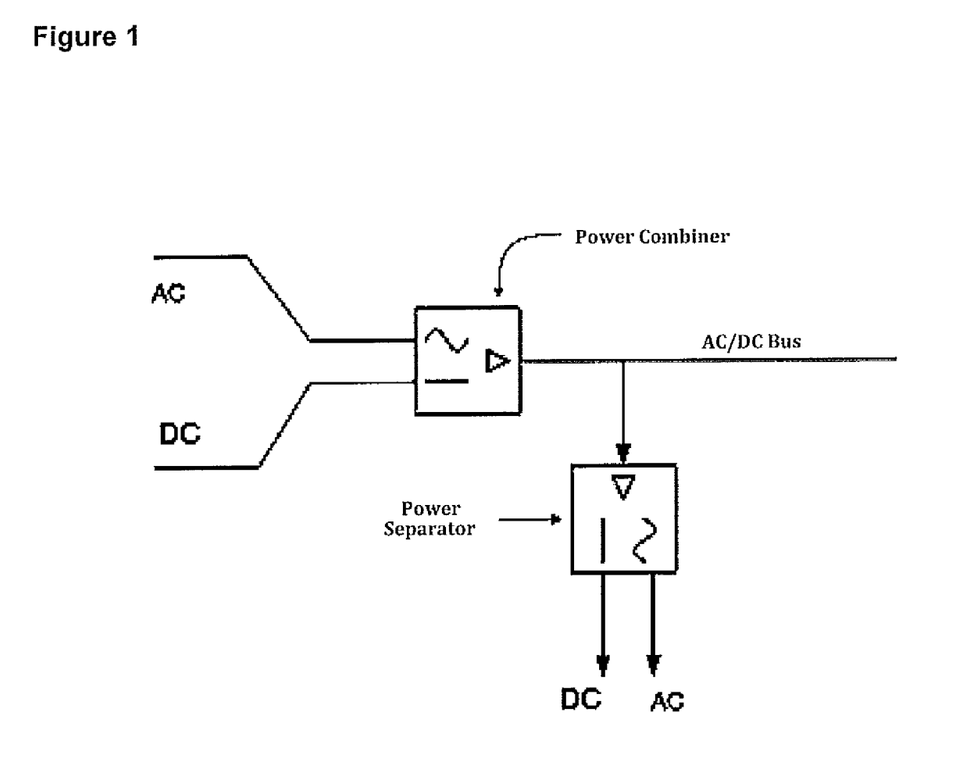
FIG. 1 illustrates a block diagram of an AC and DC power distribution system.

Systems and methods are disclosed that provide a new technology and device concept for the transport and distribution of both AC and DC power over the same wiring normally used for distributing AC power only (e.g., residential and/or commercial buildings' electrical wires). In particular, the system and method enables the simultaneous distribution of AC and DC power over the same wiring, and also enables the separation of DC power from the AC at the utilization site for use in conventional AC-only and DC-only devices. The system and methods implements two new devices, referred to herein as a "Power Combiner" and a "Power Separator." An example is shown in FIG. 1.

The devices make use of Time-Division Multiplexing (TDM), Power Multiplexing and Demultiplexing (MUX/DEMUX), and Pulse-Width Modulation (PWM) concepts to combine, separate, and reconstruct both AC and DC power using a single wiring infrastructure.

TDM is a concept extensively used in Telecommunications and digital signal applications where multiple information channels, signals (analog or digital) or bit streams are "simultaneously" transmitted over a single information medium (a wire, the air, through a radio channel, etc.). The concept is that the physical medium used for transporting the multiple information is time-shared amongst all channels, through the allocation of cyclical timeslots of fixed length that are exclusively dedicated to each individual channel. In other words, the physical channel is temporally partitioned into N recurring timeslots, therefore dividing the physical channel into N independent sub-channels. As an example, a block of data from sub-channel 1 is transmitted over the physical medium during timeslot 1, followed by a block of data from sub-channel 2 transmitted over the same physical medium during timeslot 2, and so on for all N sub-channels, then repeated again starting with sub-channel 1. The physical bus is therefore time-division multiplexed amongst all information sources.

The basic devices used in digital circuits as the building blocks of TDM buses are the Multiplexer (also MUX) and the Demultiplexer (DEMUX). A MUX selects one of many analog or digital input signals through an address or control signal, and forwards the selected input into a single output line. A DEMUX performs the inverse, by separating the signals at the input and forwarding them on separate output lines. MUX and DEMUX operate with both digital and analog signals, and Power Multiplexer applications can switch among different high power voltages and currents. The system and method uses a similar MUX/DEMUX concept with only two timeslots for multiplexing AC and DC power over a single electrical wire. The electrical wiring represents the equivalent of a TDM bus. A DEMUX synchronized with the MUX at the source then separates DC from the AC at the utilization level.

PWM is a relatively recent electronic power switching technique for regulating AC power in a very efficient way. It can be compared to the solid-state equivalent of an autotransformer able to deliver AC power at the same frequency as the source AC, but adjustable with precision and continuity from zero V (Volts) up to the same voltage of the AC source with high efficiency and relatively very small losses. The technique is commonly employed in dimmers, power supply devices, and similar AC applications.

The system and method relates to allow the distribution, simultaneously, of AC and DC power over a common wiring infrastructure using Power Combiners and Power Separators.

Figure 2:
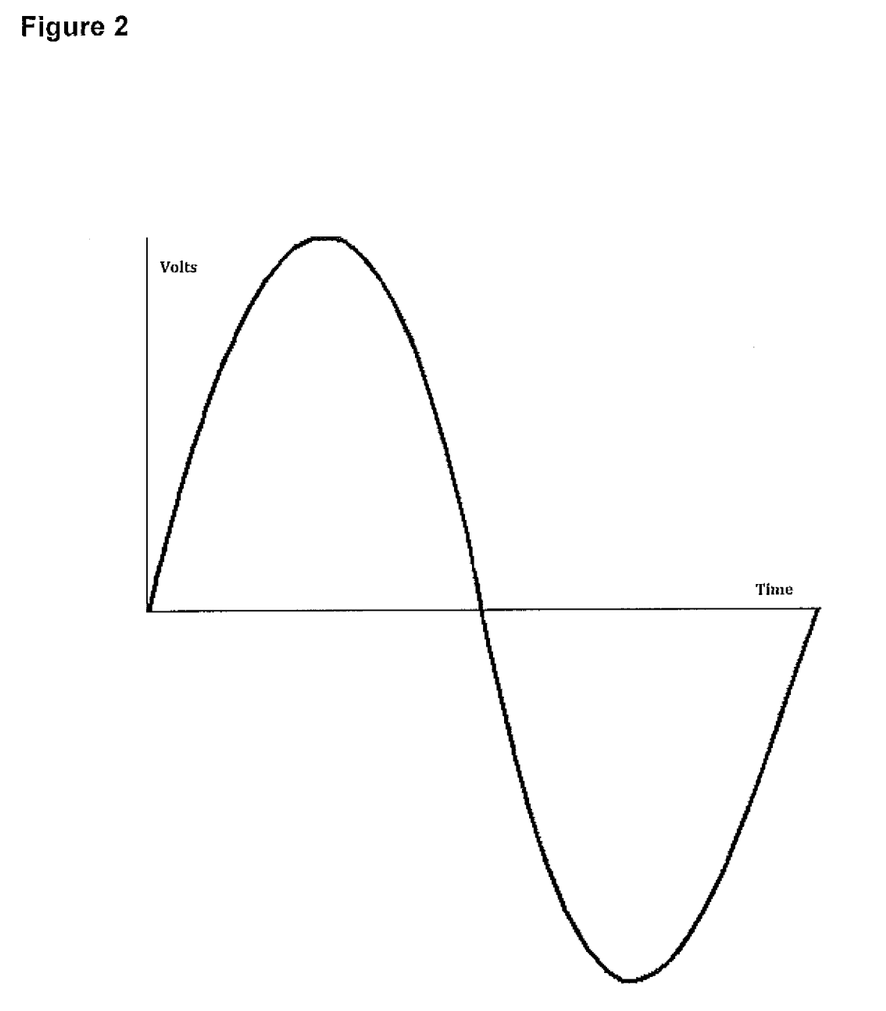
FIG. 2 illustrates a graph of an original AC sine wave.
Figure 3:
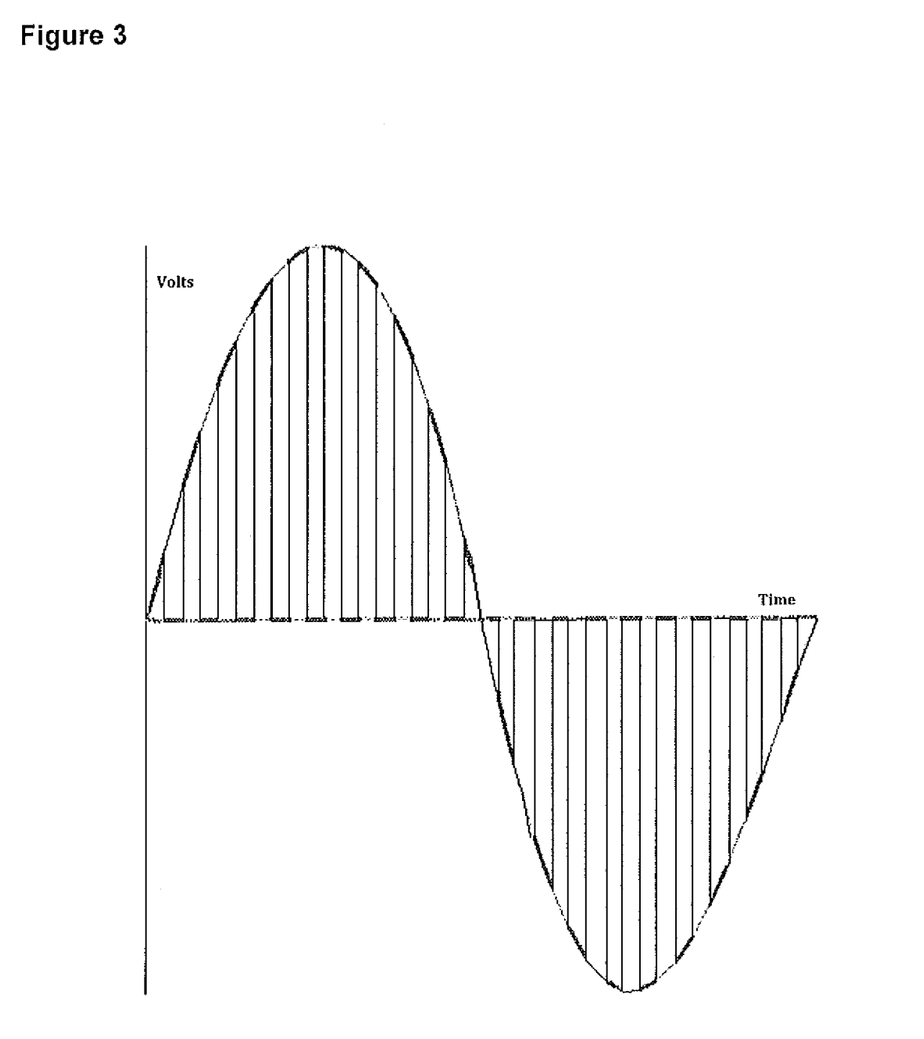
FIG. 3 illustrates a graph of a "chopped" AC sine wave.

A Power Combiner receives AC and DC power as input and has a combined AC and DC power as output (FIG. 1). Basically, the AC power's sine wave is "chopped" into many "slices" through an extremely fast electronic on/off switch, i.e., the AC is turned on and off many times per second. FIGS. 2 and 3 illustrate graphs of the original and chopped sine wave, respectively.

Figure 4:
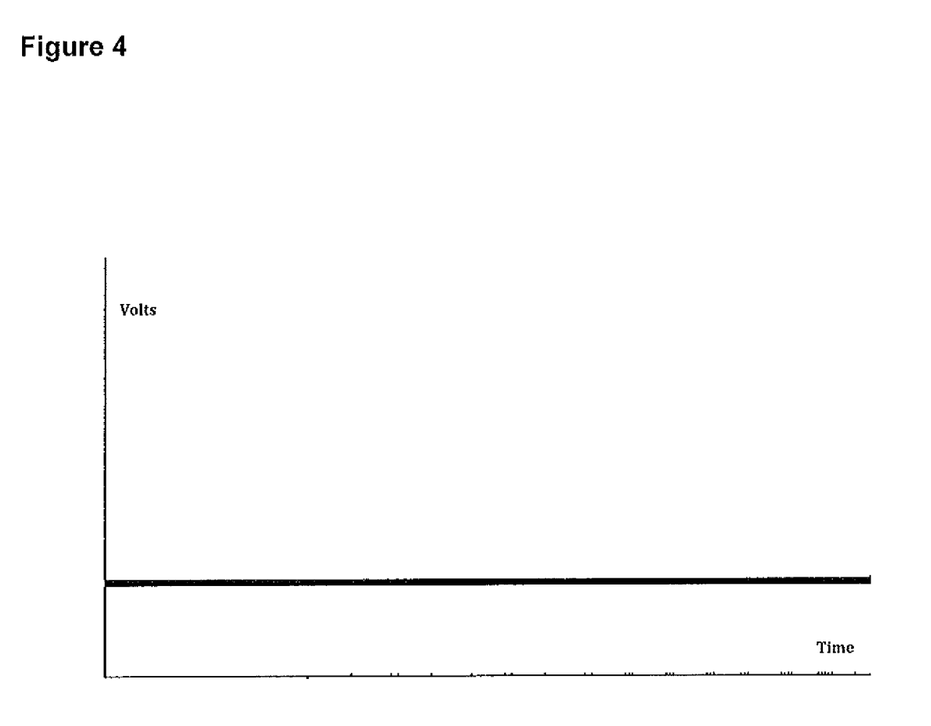
FIG. 4 illustrates a graph of an original DC voltage.
Figure 5:
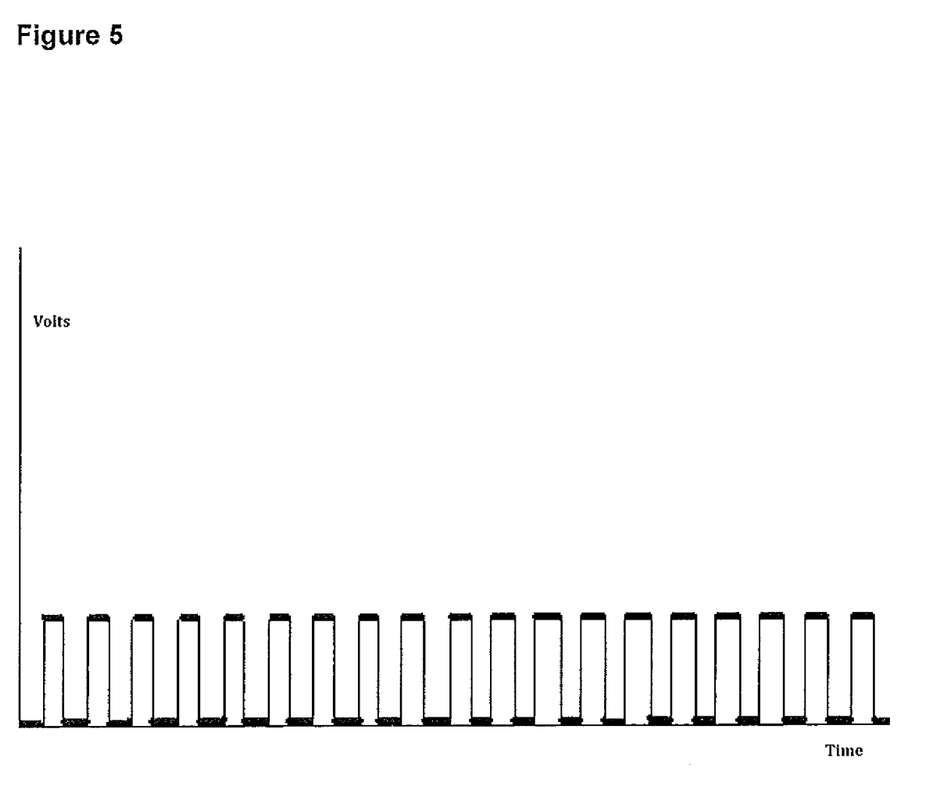
FIG. 5 illustrates a graph of a "chopped" DC voltage wave.

Conversely, the DC voltage is also chopped into many slices through a similarly fast electronic on/off switch. However, the "on" times for DC are the "off" times previously utilized for chopping the AC voltage. FIGS. 4 and 5 illustrate graphs of the original and chopped DC voltage, respectively.

Figure 6:
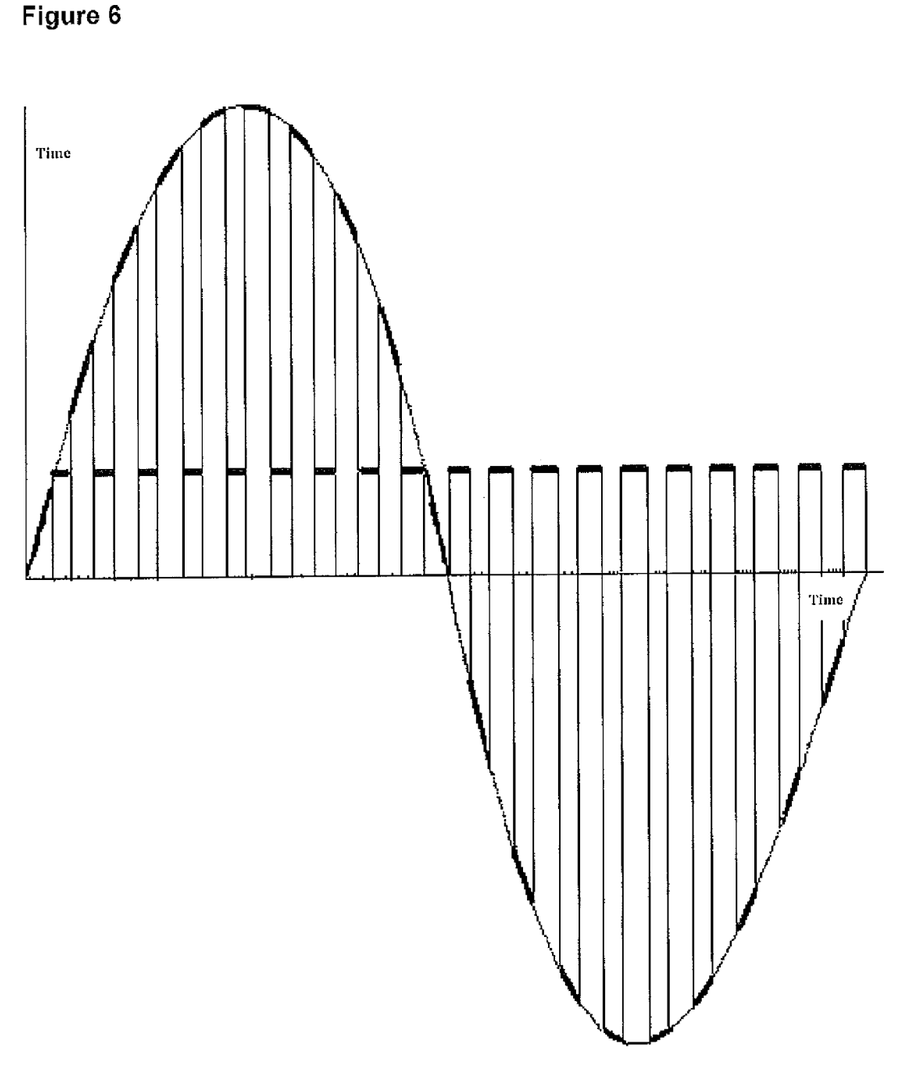
FIG. 6 illustrates a graph of a combined AC and DC power signal.

The Power Combiner makes use of the power MUX and the "off" times of the PWM power switching device to apply and transport the DC power as well as the AC power; the DC power is properly pulse-width modulated and time-complementary to the modulated AC. In other words, AC power is applied during the "on" periods, and DC power is applied during the AC "off" times of the PWM. FIG. 6 illustrates a graphical representation of the combined power concept, where the "off" times of the AC are used as "on" times for the DC. The graph represents an AC and a DC power signal chopped with a 50% duty cycle. The two power sources (AC and DC) are multiplexed through a 2-way high frequency power multiplexer and applied to the existing wiring, for example an AC/DC Bus, as shown in FIG. 1. Accordingly, the wires are time-shared between the AC and DC power signals. Various power switching devices are anticipated, such as SCR, IGCT, GTO, TRIAC, thyristors or other similar devices.

Figure 7:
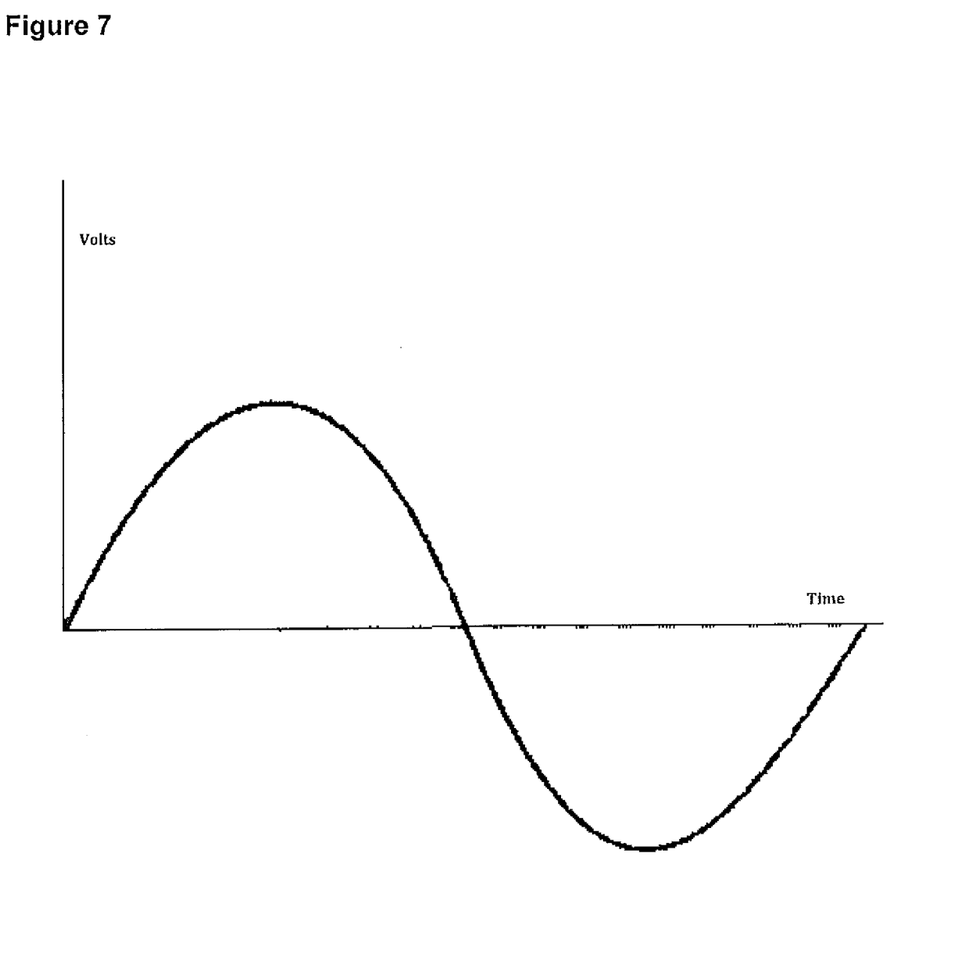
FIG. 7 illustrates a graph of a reconstructed AC sine wave.
Figure 8:
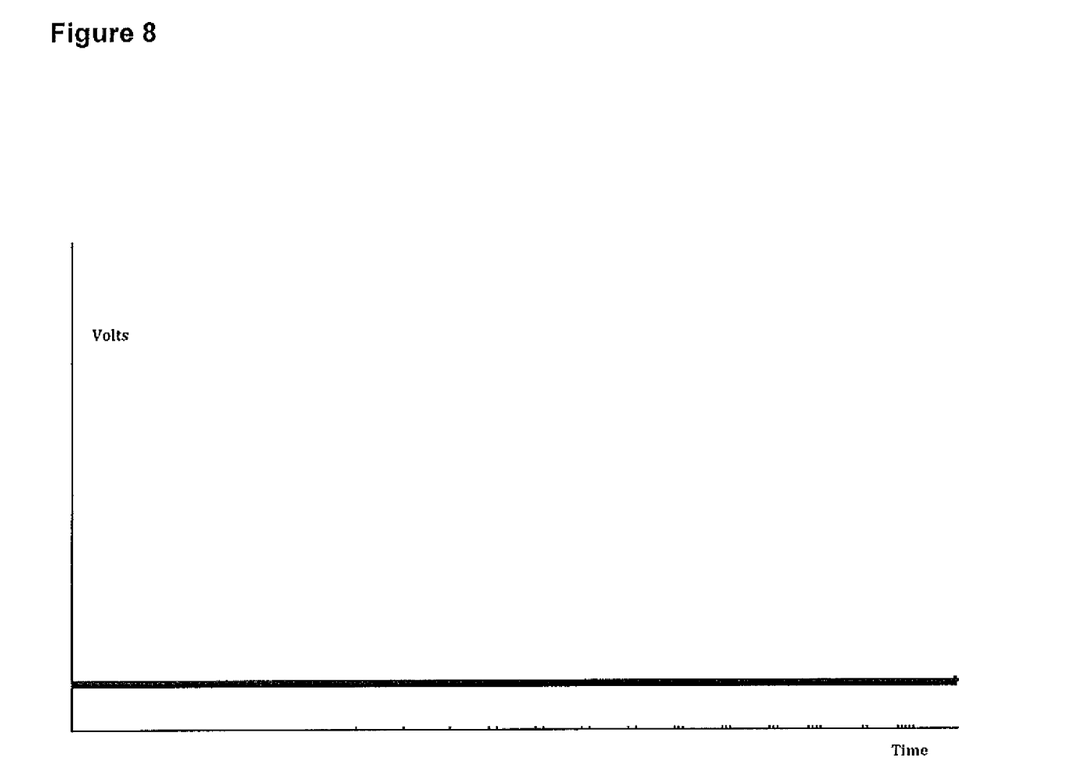
FIG. 8 illustrates a graph of a reconstructed DC voltage.

A Power Separator, as shown in FIG. 1 (device at bottom), synchronized with the MUX/PWM of the Power Combiner, separates the AC sine wave components from the DC ones via a high frequency power DEMUX. This results in chopped AC and DC waveforms similar to those shown in FIGS. 3 and 5, respectively. The resulting separated chopped AC and DC signals are then properly low-pass filtered for AC sine wave and DC power reconstruction. A conceptual view of the resulting sine wave and DC power are illustrated in FIGS. 7 and 8, respectively. The resulting AC and DC power may be applied to electric loads.

A duty-cycle of 50% (i.e., 50% of the time on, 50% off) delivers AC and DC voltages that are roughly less than half of the input voltages. In order to compensate for the lower voltage levels at the loads, a high-efficiency doubling transformer can be inserted at the AC source before it is combined with the DC power at the Power Combiner, thus allowing for the delivery of the required nominal voltage at the utilization loads. Regarding the DC voltage, it is required that the source DC level is at least double the level of the highest planned load voltage. For example, if 48 V is the highest DC voltage at the utilization load, the voltage at the source needs to be at least 96 V DC.

If the source DC is a photovoltaic panel (PV), the panels may be wired in a manner appropriate for producing the required DC source. In addition to reconstructing AC and DC at the load utilization level, the Power Separator may also allow for the delivery of multiple DC voltage levels. This may be achieved through the further PWM chopping of the DC power. Utilizing PWM and advanced switching control techniques, the system may be further enhanced by fully leveraging variable PWM and synchronization between the MUX and DEMUX devices for maximizing efficiency and providing optimal voltage levels at the load side of the system.

It should be readily appreciated by those of ordinary skill in the art that applications of this technology may include, but are not limited to, power distribution systems, such as those in homes, buildings, factories, etc.

It is noted that the examples discussed above are provided for purposes of illustration and are not intended to be limiting. Still other embodiments and modifications are also contemplated.

While a number of exemplary aspects and embodiments have been discussed above, those of ordinary skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope.

What is claimed is:

1. A method for simultaneous distribution of AC and DC power, the method comprising:
   receiving a source AC power signal and chopping the source AC power signal resulting in a chopped AC power signal;
   receiving a separate source DC power signal and chopping the source DC power signal resulting in a chopped DC power signal;
   combining the chopped AC power signal and the chopped DC power signal resulting in a combined AC and DC power signal;
   distributing the combined AC and DC power signal over a single power signal carrying medium; and
   separating the combined AC and DC power signal into a first signal comprising the chopped DC power signal and a second signal comprising the chopped AC power signal.

2. The method according to claim 1, wherein the combining comprises multiplexing and the separating comprises demultiplexing.

3. The method according to claim 1, wherein the combining comprises time-division multiplexing and the separating comprises demultiplexing.

4. The method according to claim 3, wherein the time-division multiplexing comprises a first time period for chopping the source DC power signal, wherein the first time period is about equal in length to a second time period for chopping the source AC power signal.

5. The method according to claim 1, wherein the single power signal carrying medium comprises AC wiring.

6. The method of claim 1 further comprising a filtering step wherein the first signal is filtered resulting in a continuous DC power signal and the second signal is filtered resulting in a continuous AC power signal.

7. A system for simultaneous distribution of AC and DC power, the system comprising:
   a power combiner for receiving a source AC power signal and a source DC power signal, for chopping the source AC power signal resulting in a chopped AC power signal, for chopping the source DC power signal resulting in a chopped DC power signal, and combining the chopped AC power signal and the chopped DC power signal resulting in a combined AC and DC power signal;
   a power signal distribution medium for distributing the combined AC and DC power signal; and
   a power separator for separating the combined AC and DC power signal into a first signal comprising the chopped DC power signal and a second signal comprising the chopped AC power signal.

8. The system according to claim 7, wherein the power combiner comprises a multiplexer (MUX) and a pulse-width modulation (PWM) power switching device.

9. The system according to claim 8, wherein the power separator comprises a demultiplexer.

10. The system according to claim 9 further comprising a low-pass filter for filtering the first signal comprising the chopped DC power signal and filtering the second signal comprising the chopped AC power signal, resulting in a reconstructed DC power signal and a reconstructed AC power signal.

11. A power system comprising:
   a DC power source configured to produce a DC power source signal;
   an AC power source configured to produce an AC power signal;
   a power combiner comprising a MUX and a PWM power switching device configured to receive the DC power source and create a chopped DC signal, receive the AC power source and create a chopped AC signal, and combine the chopped AC power signal with the chopped DC signal, resulting in a combined AC and DC power signal;
   a power distribution means configured to distribute the combined AC and DC power signal from the power combiner to a power utilization site; and
   a power separator comprising a demultiplexer at the power utilization site, wherein the power separator separates the combined AC and DC power signal into a first signal comprising the chopped AC signal and a second signal comprising the chopped DC signal; and
   a low-pass filter configured to receive the first signal and the second signal to produce a reconstructed output AC power signal and a reconstructed output DC power signal.

* * * * *